United States Patent
Fanshawe

[11] 3,944,994
[45] Mar. 16, 1976

[54] LIQUID LEVEL SENSOR

[75] Inventor: David Geoffrey James Fanshawe, Uckfield, England

[73] Assignee: U.S. Philips Corporation, New York, N.Y.

[22] Filed: May 17, 1974

[21] Appl. No.: 470,799

[30] Foreign Application Priority Data
May 21, 1973 United Kingdom............. 24070/73

[52] U.S. Cl............. 340/244 R; 310/8.2; 310/8.6; 310/8.1; 310/9.1; 331/65
[51] Int. Cl.² ................ G08B 21/00; H01L 27/20
[58] Field of Search ........ 340/244, 191; 331/64, 65, 331/73, 139, 155, 158, 162, ; 324/56, 57 Q; 317/144, 146, 147, ; 310/8.2, 8.5, 8.6; 73/290 V

[56] References Cited
UNITED STATES PATENTS

| | | | |
|---|---|---|---|
| 1,912,213 | 5/1933 | Nicholson | 331/65 X |
| 3,625,058 | 12/1971 | Endress et al. | 73/290 V |
| 3,745,384 | 7/1973 | Blanchard | 310/8.2 |
| 3,766,616 | 10/1973 | Staudte | 310/8.2 X |

*Primary Examiner*—John W. Caldwell
*Assistant Examiner*—Daniel Myer
*Attorney, Agent, or Firm*—Frank R. Trifari; Bernard Franzblau

[57] ABSTRACT

A liquid level sensor for determining the liquid level in a container includes an oscillator having a feedback path including first and second piezoelectric elements mounted in a turning fork arrangement to provide a first mechanical coupling path between said elements across one end of the turning fork. This first coupling path provides a first feedback signal of one given phase. A second mechanical coupling path between said elements is provided only via the liquid when the liquid is present to a level sufficient to immerse the piezoelectric elements. The second coupling path, when present, provides a second feedback signal of opposite phase to the first feedback signal. The presence or absence of the second feedback signal determines the oscillation or non-oscillation condition of the oscillator.

13 Claims, 4 Drawing Figures

LIQUID LEVEL SENSOR

The present invention relates to liquid level sensors and more particularly to liquid level sensors using piezoelectric material as the sensing element.

A known liquid level sensor uses a piezoelectric resonator in the feed back loop of an amplifier. When the piezoelectric resonator is immersed in a liquid, a load is imposed on the vibrations of the resonator, which load damps the oscillations of the piezoelectric. If the level of the liquid is then lowered so that the piezoelectric resonator is no longer immersed in the liquid this damping effect is removed, the signal around the feed back loop is increased and the amplifier, if suitably designed, will oscillate. These oscillations can be detected and used to indicate that the piezoelectric material is no longer immersed in the liquid. The system suffers from the disadvantage that in order to obtain a sufficient difference between the oscillations of the piezoelectric resonator when immersed in the liquid and when clear of the liquid, the piezoelectric resonator must be relatively large (typically 2.5 cm diameter).

It is an object of the present invention to provide a liquid level sensor using the properties of piezoelectric material and which is considerably smaller than the above described known liquid level sensor.

According to the present invention there is provided a liquid level sensor including a piezoelectric sensing element, an oscillator including a feedback path in which the piezoelectric sensing element is connected, in which the piezoelectric sensing element is constructed to have a first and a second mechanical coupling path: the first coupling path being arranged to provide one phase of feedback signal for the oscillator, the second mechanical coupling path being arranged to provide a substantially opposite phase of feedback signal, in which the second feedback signal is only present when the piezoelectric sensing element is immersed in the liquid and in which the one phase of feedback signal causes the oscillator to assume either an oscillating or a non-oscillating condition and the addition of the substantially opposite phase of signal causes the oscillator to assume the opposite condition.

Embodiments of the present invention will now be described, by way of example, with reference to the accompanying drawings, in which.

Figure 1:
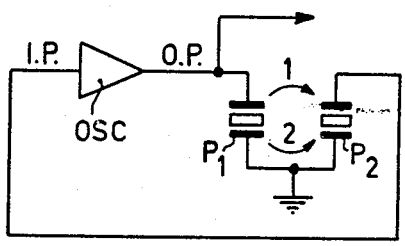
FIG. 1 shows the present invention in block diagrammatic form.

Referring now to FIG. 1, there is shown in block diagrammatic form the liquid level sensor of the present invention which includes an oscillator OSC the output OP of which is fed as an output of the system, as indicated by the arrow, and is also connected to one plate of a piezoelectric multimorph P1. A piezoelectric multimorph is a monolithic strip of piezoelectric material fabricated in such a way that it has the electromechanical properties of a bilaminar strip. The other plate of the piezoelectric multimorph P1 is connected electrically to ground. A further piezoelectric multimorph, P2, has one plate connected to ground and its other plate connected to the input IP of the oscillator.

The two pieces of piezoelectric material are positioned so that P1 acts as a driver and P2 as a driven member and it is arranged that there are two separate mechanical coupling paths 1 and 2 between them, as indicated by the arrows in FIG. 1. One of the coupling paths, for example path 1, is arranged to be present due to the actual mechanical construction of the arrangement. Thus the mechanical coupling via path 1 can be considered to be of a constant value.

The other mechanical coupling path 2 is arranged to be present (to any meaningful degree) only when the mechanical arrangement is immersed in a liquid. The mechanical coupling path 1 may, for example, be arranged to interpose a 180° phase shift in the feedback loop, this phase shift being such as to cause the oscillator OSC to oscillate. Thus when the mechanical arrangement is in a gaseous medium the coupling through path 1 will be such as to cause the oscillation since there will be no significant degree of coupling via path 2.

The coupling through path 2 is arranged to oppose the coupling due to path 1, i.e., to be in anti-phase to the coupling through path 1. When the mechanical arrangement of P1 and P2 is immersed in a liquid the coupling through path 2 is arranged to be greater than (or at least equal to), in magnitude, the coupling through path 1. Thus the oscillator OSC at its input IP will receive a signal of the wrong phase to maintain oscillations and the output oscillations will cease when the mechanical arrangement is lowered into a liquid.

Figure 2:
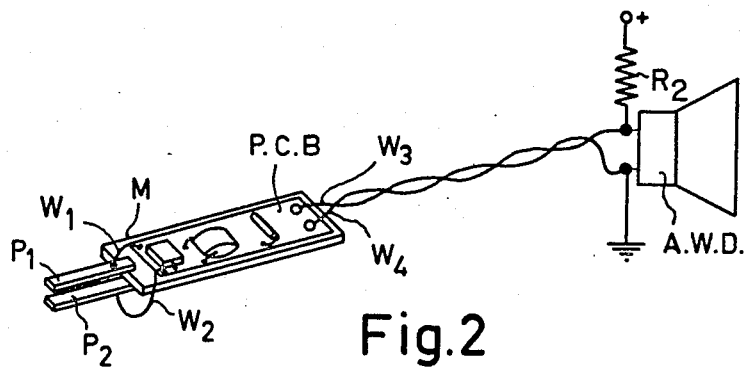
FIG. 2 shows a perspective view of the liquid level sensor according to the present invention.
Figure 3:
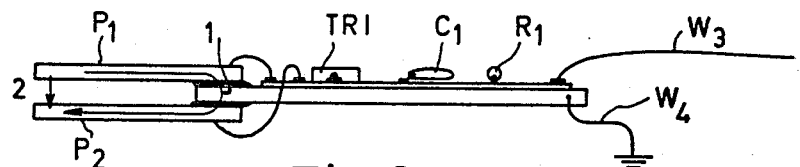
FIG. 3 shows a side elevation of the mechanical arrangement of the piezoelectric parts of the present invention.

A practical embodiment of the present invention is shown in FIG. 2. The two pieces of piezoelectric multimorph material P1 and P2 are fixed to a sheet of metal M by any suitable means, for example clamping, soldering or gluing. If a conductive glue is used then the inner faces of the piezoelectric material P1 and P2 will be conductively joined together. Therefore grounding the metallic plate M will serve to ground the inner face of the two piezoelectric multimorphs P1 and P2.

The pieces of piezoelectric multimorph material P1 and P2 are, as shown, shaped in the form of long strips, and positioning these long strips opposite one another on the end of the metallic sheet M produces a tuning fork arrangement.

Figure 4:
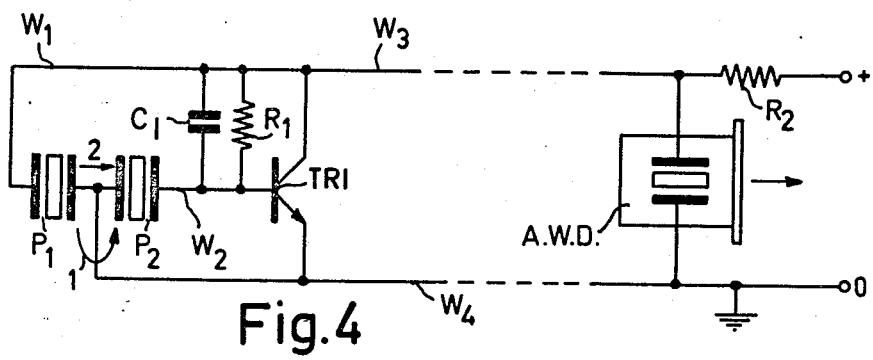
FIG. 4 shows a circuit diagram for explaining the electrical operation of the present invention.

A printed circuit board PCB is mounted on the metallic sheet M by any suitable means, e.g., gluing. The components for the amplifier (as shown in FIG. 4) may then be suitably mounted on the printed circuit board. Connections to the outside faces of the two pieces of piezoelectric bimorph material may be made via wires W1, W2 as shown. The sensing device is connected to an audible warning device AWD via leads W3, W4 (lead W3 being unnecessary if a ground connection is made via the metallic sheet M). One terminal of the audible warning device is connected to a positive supply voltage via a resistor R2 (see FIG. 4).

The printed circuit board PCB in a preferred embodiment is a flexible printed wiring board constructed by etching copper tracks on to a sheet of polyester film material.

The audible warning device AWD in a preferred embodiment is a peizoelectric sound generator.

Referring now to FIG. 4, the oscillator OSC includes a transistor TR1 the emitter of which is connected to ground potential and the collector of which is connected via resistor R2 to the positive supply potential. A parallel combination of a resistor R1 and a capacitor C1 is connected across the base-collector junction of transistor TR1. The collector of transistor TR1 is connected via wire W1 to the outside face of the piezoelectric multimorph P1 and the base of transistor TR1 is connected via wire W2 to the outside face of the piezoelectric multimorph P2. The two innermost plates of the piezoelectric multimorph P1 and P2 are common and are connected via wire W4 to the ground connection. The audible warning device AWD is shown as the preferred embodiment of a piezoelectric audible sound generator.

The coupling between the two pieces of piezoelectric multimorph material P1 and P2 is therefore, as explained above, in the correct phase and of sufficient amplitude to cause the oscillator TR1, R1, C1 to oscillate when the pieces of piezoelectric multimorph material P1 and P2 are not immersed in a liquid. When the pieces of piezoelectric material P1 and P2 are immersed in a liquid the coupling between P1 and P2 is arranged to be of the wrong phase to cause oscillations.

The audible warning device AWD will emit a warning when the pieces of piezoelectric material P1 and P2 are not immersed in a fluid. By arranging the pieces of piezoelectric multimorph material P1 and P2 at a desired level in, for example, the oil reservoir (sump) of an engine a warning may be obtained when the oil level falls below that desired level.

By including a further phase change round the feedback loop it can be arranged that the oscillator formed by transistor TR1, resistor R1 and capacitor C1 normally oscillates when the pieces of piezoelectric multimorph strips P1 and P2 are immersed in a liquid and ceases to oscillate when the liquid level falls below a desired level. A convenient way to achieve this phase reversal is to reverse the electrical connections to one of the piezoelectric multimorphs. In this case the inner faces of the two PXE multimorphs must not be electrically connected and it would be convenient to use a strip of insulating material in place of the metal sheet M. This material could be a piece of printed circuit board, appropriately etched on either side, to which the multimorphs would be bonded as before. In this case a detection arrangement for the output of the oscillator would be used to trigger a relay and, for example, to light a warning lamp since a continuous audible warning signal would be intolerable.

Although, for economic reasons, multimorph elements were used in the preferred embodiment, the transducers P1 and P2 could alternatively use any equivalent flexure element which utilises the differential strain between two bonded layers of piezoelectric material (i.e., a "bimorph") or one layer of piezoelectric material bonded to a compliant layer of inert material such as sheet metal.

In a practical embodiment the piece of metal M was chosen to be 4 mm wide and approximately 3 cm long. The metallic sheet M was 1 mm thick, the pieces of piezoelectric multimorph material each being 15 mm long, 1.6 mm wide and 0.6 mm thick. The components used for TR1, R1 and C1 were miniature components and it may therefore be easily seen that the sensing element may be contained within a tube of approximately 4 mm diameter. A tube of such diameter is suitable for insertion through the "dip-stick" hole in a conventional automobile engine. If the metallic sheet M is grounded to the engine via a metallic dip-stick only a single wire connection need be supplied, thus making it easy to substitute a dip-stick with the sensing device attached to the end for the conventional dip-stick in an automobile engine.

For an audible warning frequency of 2 kilohertz the value of the components were as follows:

| | |
|---|---|
| C1 | 100 picofarads |
| R1 | 820 K ohms |
| R2 | 4.7 K ohms |
| TR1 | BCW 72R |

The piezoelectric multimorph strip was made of Philips PXE 5 material.

What we claim is:

1. A liquid level sensor comprising, piezoelectric sensing means, an oscillator capable of assuming an oscillation state and a non-oscilating state and including a feedback path in which the piezoelectric sensing means is connected, the piezoelectric sensing means comprising first and second piezoelectric elements mounted to provide a first and a second mechanical coupling path between said first and second piezoelectric elements, the first coupling path being arranged to provide one phase of feedback signal for the oscillator and the second mechanical coupling path being arranged to provide a second feedback signal of substantially opposite phase, the second feedback signal only being present when the piezoelectric sensing element is immersed in the liquid and in which the one phase of feedback signal causes the oscillator to assume one of its two states and the addition of the substantially opposite phase of signal causes the oscillator to assume the opposite state.

2. A liquid level sensor as claimed in claim 1 in which the piezoelectric sensing means includes two piezoelectric flexure strips mounted opposite one another in a tuning fork arrangement.

3. A liquid level sensor as claimed in claim 2 in which the tuning fork arrangement comprises two strips of piezoelectric multimorph material affixed to opposite sides of a printed circuit board.

4. A liquid level sensor as claimed in claim 2 in which the tuning fork arrangement comprises two strips of piezoelectric multimorph material affixed to opposite sides of the end of a sheet of metal.

5. A liquid level sensor as claimed in claim 4 in which the strips of piezoelectric multimorph material are fixed to the metal sheet in an electrically conductive manner so that the inner surfaces of the two pieces of piezoelectric material are electrically connected together through the metal sheet.

6. A liquid level sensor as claimed in claim 4 in which the oscillator is mounted on the sheet of metal.

7. A liquid level sensor as claimed in claim 5 in which the oscillator is mounted on the metal sheet and in which only a single wire is connected to the liquid level sensor, the metal sheet being grounded to provide a return voltage supply rail.

8. A liquid level sensor as claimed in claim 1 in which the oscillator includes a transistor, a resistor and capacitor connected in parallel across the collector-base junction of the transistor, means connecting the piezoelectric sensing means in series between the collector and base of the transistor, and means connecting the emitter of the transistor to a first d.c. supply rail and the collector of the transistor to a second d.c. supply rail via a collector load resistor.

9. A liquid level sensor as claimed in claim 8 in which the first supply rail is grounded.

10. A liquid level sensor as claimed in claim 9 in which a piezoelectric sound generator is connected between the collector of the transistor and the first d.c. supply rail.

11. A liquid level sensor for determining the level of a liquid in a container comprising, an oscillator capable of assuming an oscillating state and a non-oscillating state and including a feedback path comprising first and second piezoelectric elements mounted to provide a first fixed mechanical coupling path therebetween and a second mechanical coupling path therebetween via the liquid in the container and variable as a function of the container liquid level, said first coupling path being arranged to supply a first feedback signal of one phase whereby the oscillator assumes one of its two states, said second mechanical coupling path providing a second feedback signal of opposite phase to the first feedback signal only when the container liquid level is above a given level sufficient to immerse the piezoelectric elements thereby to oppose the first feedback signal and cause the oscillator to assume the second of its two states.

12. A liquid level sensor as claimed in claim 11 wherein said first and second piezoelectric elements comprise first and second flexure strips mounted in parallel spaced apart relationships and each mounted at one common end to a support member so that the first piezoelectric flexure strip mechanically drives the second piezoelectric flexure strip via said support member thereby forming said first fixed mechanical coupling path.

13. A liquid level sensor as claimed in claim 11 wherein said first and second piezoelectric elements comprise first and second strips of piezoelectric multimorph material mounted in parallel to a support member to form a tuning fork whereby the vibration of the second strip is determined by the vibration of the first strip and said first mechanical coupling path includes the support member.

* * * * *